United States Patent
King et al.

(10) Patent No.: US 7,314,353 B2
(45) Date of Patent: Jan. 1, 2008

(54) PUMP ASSEMBLY FOR TRANSPORTING A COOLING FLUID

(75) Inventors: Daniel W. King, Valparaiso, IN (US); Steven Gregory Redelman, Kouts, IN (US)

(73) Assignee: Urschel Laboratories, Inc., Valparaiso, IN (US)

( * ) Notice: Subject to any disclaimer, the term of this patent is extended or adjusted under 35 U.S.C. 154(b) by 0 days.

(21) Appl. No.: 11/237,859

(22) Filed: Sep. 29, 2005

(65) Prior Publication Data

US 2006/0083636 A1     Apr. 20, 2006

Related U.S. Application Data

(60) Provisional application No. 60/616,631, filed on Oct. 8, 2004.

(51) Int. Cl.
*F04B 19/00*     (2006.01)
*F01M 1/04*     (2006.01)

(52) U.S. Cl. ............. 417/470; 184/6.5; 184/27.1

(58) Field of Classification Search ............. 417/470; 184/6.5, 27.1; 241/74, 89.2, 199.12, 259, 241/285.1
See application file for complete search history.

(56) References Cited

U.S. PATENT DOCUMENTS

| | | | | |
|---|---|---|---|---|
| 1,677,978 | A | * | 7/1928 | Messer ............. 137/110 |
| 1,937,019 | A | * | 11/1933 | Hamill ............. 184/27.2 |
| 2,382,452 | A | * | 8/1945 | Svenson ............. 417/206 |
| 3,084,762 | A | * | 4/1963 | Thomas ............. 184/6.12 |
| 3,139,129 | A | * | 6/1964 | Urschel et al. ............. 83/13 |
| 3,150,546 | A | * | 9/1964 | Budney et al. ............. 408/99 |
| 3,618,712 | A | * | 11/1971 | Casey ............. 184/6.28 |
| 3,967,698 | A | * | 7/1976 | Smith et al. ............. 184/15.2 |
| 4,050,544 | A | | 9/1977 | Kalyan et al. |
| 4,678,411 | A | | 7/1987 | Wieland |
| 4,679,659 | A | * | 7/1987 | Jendick ............. 184/15.2 |
| 4,892,468 | A | | 1/1990 | Maehara |
| 5,363,740 | A | | 11/1994 | Coakley |
| 5,374,168 | A | | 12/1994 | Kozawa et al. |
| 5,618,335 | A | | 4/1997 | Pink et al. |
| 6,539,913 | B1 | | 4/2003 | Gardiner |
| 6,550,971 | B1 | | 4/2003 | Volz |
| 6,676,389 | B2 | * | 1/2004 | Bartsch ............. 417/470 |

OTHER PUBLICATIONS

Model CC-D information, Urschel Laboratories, downloaded on Sep. 10, 2003 at http://www.urschel.com/machines.php?mid=39.

* cited by examiner

*Primary Examiner*—Charles G Freay
(74) *Attorney, Agent, or Firm*—Bacon & Thomas, PLLC

(57) ABSTRACT

A pump assembly includes a cam member arranged to rotate about an axis, and a piston pump having a cylinder body with a biased piston drivingly displaceable within the cylinder body and engageable with the cam member such that rotation of the cam member corresponds to reciprocating movement of the piston. The pump assembly is arranged for use in a food cutting machine for transporting cooling fluid from a reservoir to at least one bearing arrangement provided to support a rotating shaft.

15 Claims, 3 Drawing Sheets

PUMP ASSEMBLY FOR TRANSPORTING A COOLING FLUID

This application claims the benefit of priority of U.S. Provisional Application No. 60/616,631, filed on Oct. 8, 2004.

BACKGROUND INFORMATION

Food cutting machines often include mechanical components that operate at high temperatures and are sealed from exposure to food products. For example, a drive assembly for a food cutting machine, such as in Model CC-D manufactured by Urschel Laboratories, Valparaiso Ind., has been found to have a drive assembly that fails due to repeated use. It has been determined that the major culprit of the failure is bearing assembly failure.

There have been many factors found that result in the bearing assembly failure which include: high-pressure cleaning of the mechanical components which results in driving the grease from the bearing assemblies, improper consistency of grease, and excessive preloading of the bearing. Unfortunately, due to the compartmentalized nature of these food cutting machines, current designs do not provide easy access to the bearing assemblies used to stabilize and secure rotating components of the machine.

In order to lubricate the bearing assemblies, one must disassemble an entire drive assembly in order to access the bearing assemblies. This is a time consuming endeavor and results in the machine being inoperable over a period of time, which in turn results in loss of production.

In the past, bearing assembly failure has been an accepted operating condition. Different types of grease, seals and combinations thereof, and preloading of bearing assemblies have been employed to remedy the failure of the bearing assemblies. While grease is used to lubricate bearing assemblies in known drive assembly designs, there is no means to maintain lubrication of the bearing assemblies once a drive assembly is assembled.

It is important to keep in mind that when cutting food products, it is necessary that the cutting machine remain free of debris or lubrication media so as not to contaminate the food product. In addition, the cutting machine must be made of a simplified design to enable easy clean-up and maintenance. It follows that the food cutting machines must be sufficiently versatile while maintaining a high degree of operating precision. Due to the relatively high volume of cutting operations that these food cutting machines are intended to perform, down time of the machines due to mechanical failure is highly undesirable. Therefore, mitigating bearing assembly failure is a high concern for operators of these cutting machines.

For the foregoing reasons, there is need for a device or method that remedies the bearing assembly failure in known food cutting machines while being configured so as to operate effectively while enabling easy maintenance and precision operation of the food cutting machine.

SUMMARY

Embodiments of the present invention are directed to a pump assembly for use in an impeller drive assembly for supplying cooling fluid to at least one bearing assembly used to support and stabilize an impeller shaft. In particular, the pump assembly is particularly useful in a food cutting machine of the type described above.

According to one embodiment, the pump assembly includes a cam member securable to an impeller shaft and arranged to rotate about the impeller shaft axis, a piston pump including a cylinder body with a biased piston drivingly displaceable within the cylinder body and engages with the cam such that rotation of the cam corresponds to reciprocating movement of the piston within the cylinder body, a first valve connected to the piston pump and operable to permit the pumping of fluid into the cylinder body, and a second valve connected to the piston pump and operable to permit the pumping of fluid out from the cylinder body. Suitable passageways are provided to connect the first and second valves to the piston pump. Moreover, conduits are provided which connect the first valve to a fluid reservoir, and the second valve to a bearing assembly or other mechanical components requiring cooling.

According to another embodiment, the first and second check valves are ball valves. Moreover, the cylinder body and bodies corresponding to the check valves may be formed in a single body construction wherein the bodies and connecting passageways are formed in the single body.

In yet another embodiment, a drive assembly is provided having an impeller shaft mounted for rotation about a first axis of rotation, a drive shaft mounted for being driven about a second axis of rotation, a gear arrangement coupling the drive and impeller shafts, and at least one bearing arrangement engaging the impeller shaft. The drive assembly includes an embodiment of the pump assembly wherein the cam member is secured for rotation with the impeller shaft to operate the pump assembly. According to this embodiment, a reservoir of lubricating fluid may be provided wherein the pump assembly communicates with the reservoir to extract lubricating fluid therefrom and transporting the same to at least one bearing assembly.

BRIEF DESCRIPTION OF THE DRAWINGS

These and other features, aspects, and advantages of the present invention will become better understood with regard to the following description, appended claims, and accompanying drawings where:

DETAILED DESCRIPTION OF VARIOUS EMBODIMENTS

A. Overview

Figure 1:
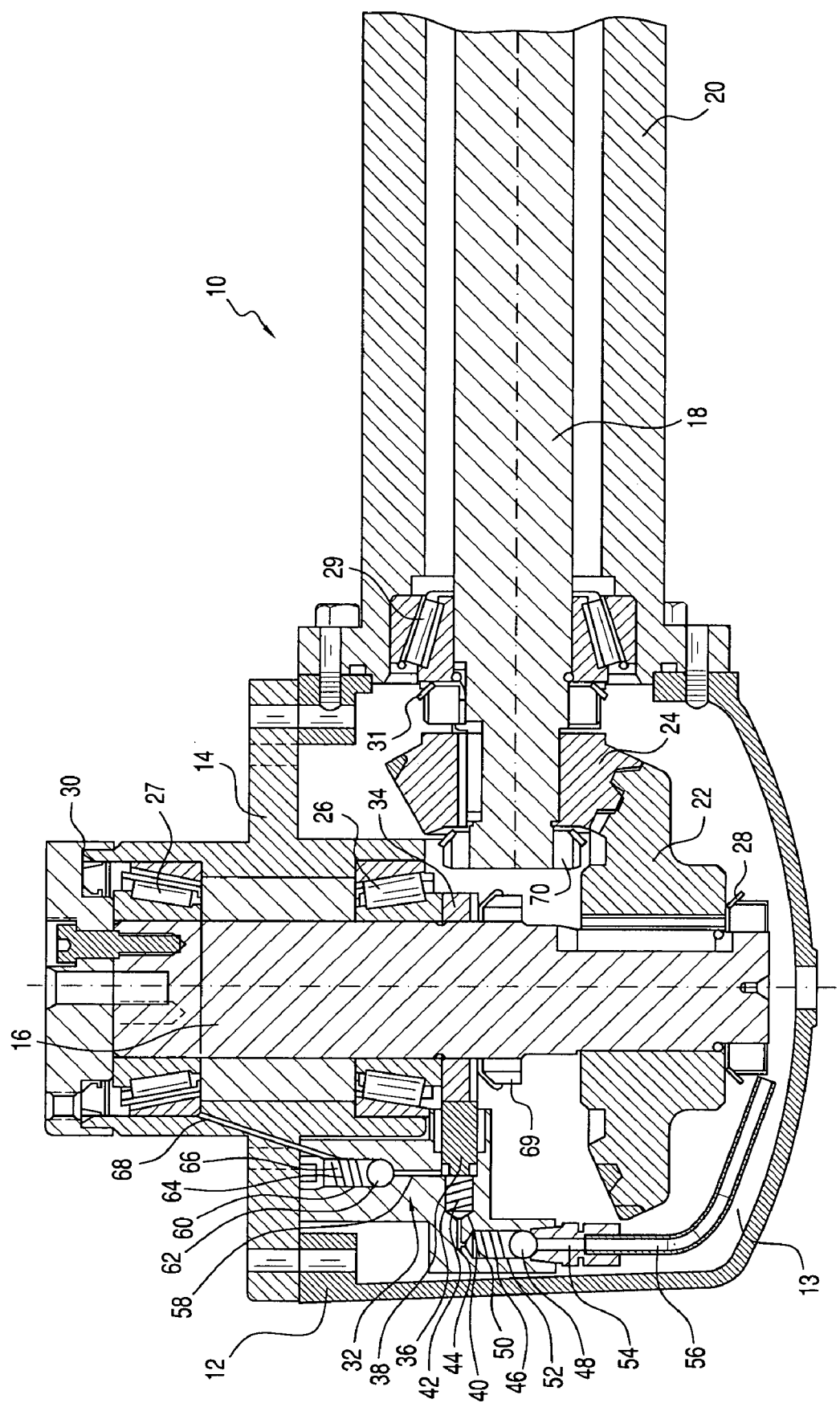
FIG. 1 is an elevational cross-sectional view showing an impeller drive assembly having an embodiment of a pump assembly according to the invention.

A better understanding of different embodiments of the invention may be had from the following description read in conjunction with the accompanying drawings in which like reference characters refer to like elements.

While the disclosure is susceptible to various modifications and alternative constructions, certain illustrative embodiments thereof are shown in the drawings and will be described below in detail. It should be understood, however, that there is no intention to limit the disclosure to the specific embodiments disclosed, but on the contrary, the intention is to cover all modifications, alternative constructions, combinations, and equivalents falling within the spirit and scope of the disclosure and defined by the appended claims.

It will be noted that, unless a term is expressly defined in this patent to possess a described meaning, there is no intent to limit the meaning of such term, either expressly or indirectly, beyond its plain or ordinary meaning.

Any element in a claim that does not explicitly state "means for" performing a specified function, or "step for" performing a specific function, is not to be interpreted as a "means" or "step" clause as specified in 35 U.S.C. § 112, paragraph 6.

B. Environment and Context of Embodiments

Various embodiments of the pump assembly according to the invention are provided for use in an impeller drive assembly of a precision food cutting machine. An example of a food cutting machine is the Model CC-D produced by Urschel Laboratories Incorporated of Valparaiso, Ind. In the present disclosure, only the essential components of an impeller drive assembly are shown for exemplary purposes, and thus a food cutting machine, as a whole, is neither described nor illustrated herein. The impeller drive assembly may be configured to operate with a variety of different cutting heads or impellers, and moreover, the impeller drive assembly may be adapted for other applications outside of those for rotating an impeller wherein rotary motion via a shaft is required.

In accordance with the impeller drive assembly described herein, various bearings, shims, seals, gears and valves are described and shown in the drawings. It will be noted that the invention is not limited to the embodiments or types of components described and shown herein, but such components may be modified or replaced with comparative and suitable components to provide normal operation of the impeller drive assembly.

Use of the inventive pump assembly is not to be restricted for use solely in food cutting machines, but it may be adapted for use in a variety of machinery wherein a cam may be mounted on a shaft for rotation therewith and operable to displace a piston pump so as to transport fluid to a predetermined location. The inventive pump assembly may be used to cool a variety of mechanical components and it is not limited to cooling a bearing assembly as described herein.

C. Various Embodiments of the Pump Assembly

FIG. 1 illustrates an impeller drive assembly 10 of a food cutting machine. A gear case 12 and an impeller bearing housing 14 are provided for surrounding an impeller shaft 16 and the components associated therewith. The impeller shaft 16 is mounted for rotation within the impeller bearing housing 14. The gear case 12 defines a reservoir 13 suitable for retaining a body of lubrication oil. A drive shaft 18 surrounded by a horizontal bearing housing 20 couples with the impeller shaft 16 via a first spiral bevel gear 22 mounted on a first end of the impeller shaft 16 and a second spiral bevel gear 24 mounted on a first end of the drive shaft 18.

Suitable bearing devices are provided to support and balance the impeller shaft 16 and the drive shaft 18. For example, the impeller bearing housing 14 includes at least first and second roller bearings 26, 27 generally arranged along the drive shaft 18. The first roller bearing 26 is positioned generally at a middle length of the impeller shaft 16, and the second roller bearing 27 is generally positioned at the second end of the impeller shaft 16. A suitable bearing device 29 is provided for the drive shaft 18. Additional bearing devices may be used along the length of the impeller or drive shafts in order to provide additional support and stability to these shafts. While the bearing devices are shown in FIG. 1 as comprising conventional roller bearings, other bearings devices may be used in conjunction with the impeller and the drive shaft, such as multiple roller bearings or thrust bearings.

A lockwasher/locknut 28 is provided near or at the first end of the impeller shaft 16. A primary seal arrangement 30 is provided at the second end of the impeller shaft 16 at a location beyond the second roller bearing 27. A lockwasher/locknut 31 is provided along the drive shaft 18.

The lockwasher/locknut 28 is used to fasten the spiral bevel gear 22 to the impeller shaft 16. The lockwasher/locknut 31 is used to preload the roller bearing 29 without respect to mounting center distances of the spiral bevel gears 22, 24. The locknut/lockwasher 69 is used along with a cam member 34 to preload the impeller bearings 26, 27. Another seal arrangement 70 is located at the far end of the drive shaft 18 (opposite the gear end). The seal arrangements 30, 70 are used to prevent oil loss and the introduction of contaminants.

Other seal arrangements may be provided at various locations of the impeller shaft and drive shaft to prevent loss of lubrication oil and the introduction of contaminants into the impeller drive assembly. The seals may be of the type that are resistant to lubrication oil and prevent the passage of oil between the seal and mechanical components.

The pump assembly 32 is shown as including the cam member 34 which is eccentrically mounted to the impeller shaft 16 for rotation about a rotational axis of the impeller shaft 16. A piston pump 36 is provided to cooperate with the rotation of the cam member 34, and first and second check valves 46, 60 are in communication with the piston pump 36 for removing fluid from the reservoir 13 and discharging the removed fluid to the second roller bearing 27.

Figure 2:
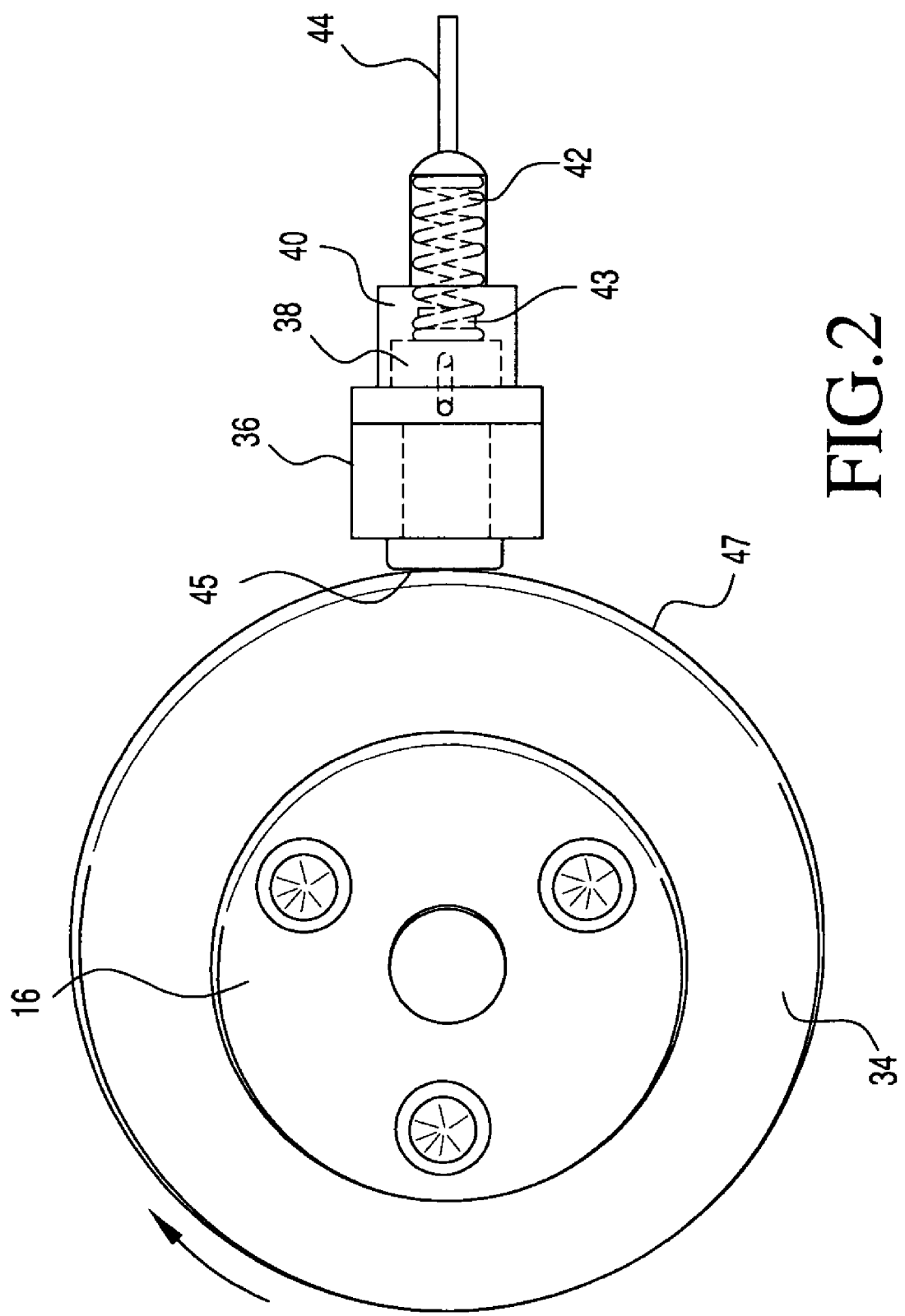
FIG. 2 is a schematic plan view showing portions of the pump assembly of FIG. 1.

As shown in greater detail in FIG. 2, the piston pump 36 includes a reciprocating piston 38 that protrudes from a cylinder body 40 of the piston pump 36. The piston 38 is arranged so that a first end 43 is biased against a piston spring 42 provided in the cylinder body 40 and a second end 45 is pressed against the outer circumferential face 47 of the rotating cam member 34. Through rotational movement of the impeller shaft 16, and by the actions of the piston spring 42 and the cam member 34, the piston 38 reciprocates in the cylinder body 40.

Figure 3:
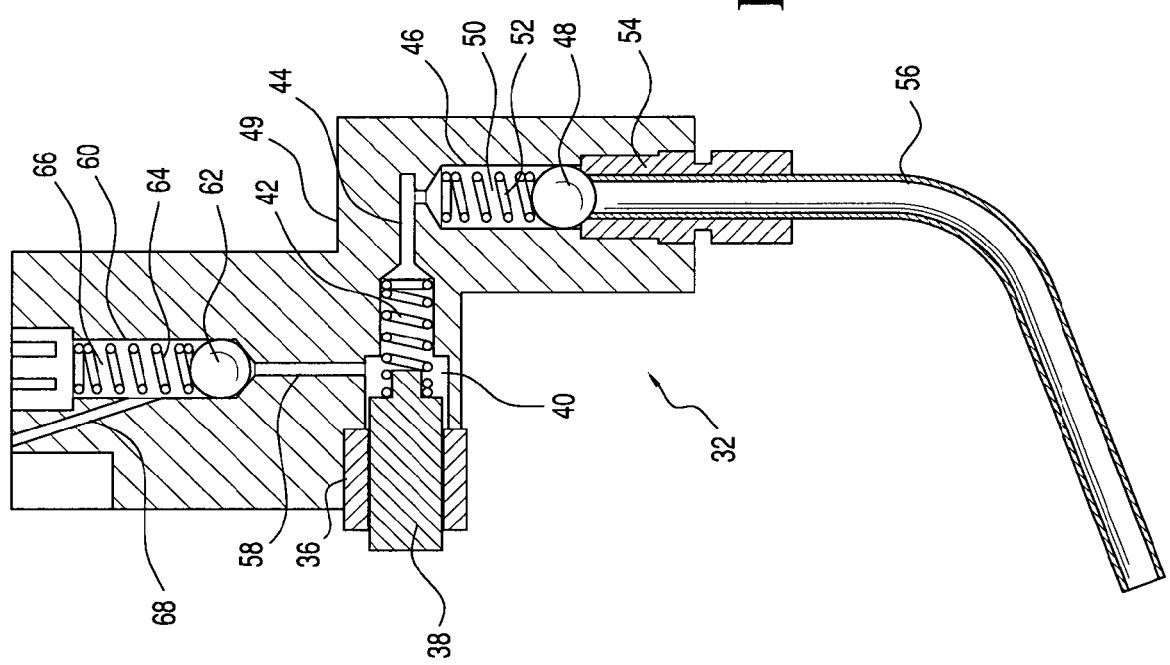
FIG. 3 is a schematic elevational view showing portions of the pump assembly of FIG. 1.

FIG. 3 illustrates an embodiment of the pump assembly with the piston pump 36 connected to the first and second valves 46, 60. A first passageway 44 is provided to connect the piston pump 36 to the first valve 46. In the embodiment shown herein, the first valve 46 is a ball valve having a valve body 50 with a ball bearing 48 retained by a spring 52 within the valve body 50. At an end opposite of the first passageway 44, the first valve 46 has a receiving portion 54 that connects to a first fluid conduit 56 which extends from the first valve 46 to permit fluid extraction from the reservoir 13.

A second passageway 58 is provided which connects the piston pump 36 to the second valve 60. Similar to the first valve 46, the embodiment of the second valve 60 is depicted in FIG. 3 as a ball valve having a valve body 64 and a ball bearing 62 retained by a spring 66 within the valve body 64. A second fluid conduit 68 connects to the valve body 64 and extends, as shown in FIG. 1, to the second ball bearing 27.

Operation of ball bearing check valves is well understood to those skilled in the art and a general description of their operation is therefore not provided in this disclosure. Moreover, the pump assembly is not limited to ball check valves as described herein, and other suitable check valves may be used such as flapper or disk valves types.

The pump assembly 32 includes the cylinder body 40, valve bodies 50, 64 and passageways 44, 58 formed in an assembly body 49. This assembly body 49 may comprise a single-body construction, numerous components which are connected to one another, or halves which are secured together by welding or fasteners. A single-body construction is particularly advantageous in that it can easily be replaced as a single should the pump assembly fail to operate or become contaminated. Alternatively, the pump assembly may be arranged without the assembly body wherein the constituents of the pump assembly such as the piston pump, check valves and passageways are connected to one another and separately mounted within the gear case of the impeller drive assembly.

In accordance with the embodiment shown in FIGS. 1-3, the cam member 34 urges the piston 38 into the cylinder body 40 on the basis of the rotation of the cam member 34 with the impeller shaft 16. When the piston 38 is moved away from the cylinder body 40 by the cam member 34 by rotation of the impeller shaft 16, the valve element 48 of the first valve 46 moves due to a pressure difference between inside the cylinder body 40 and inside the reservoir 13 to open the first valve 46 and to allow the fluid to flow through both the first conduit 56 and first passageway 44 into the cylinder body 40. On the other hand, the second valve 60 is closed at this instance since the ball bearing 62 is drawn to seal the inlet of the second passageway 58.

When the piston 38 is moved towards the cylinder body 40 by the cam member 34, the valve element 62 of the second valve 60 moves due to the pressure difference inside the cylinder body 40 and inside the second valve body 64 to eject the fluid in the cylinder body 40 through the second passageway 58 and second valve 60 and through the second conduit 68 towards the second ball bearing 27.

The fluid stored in the reservoir and circulated by the pump assembly is preferably oil. An advantage to the pump assembly is that oil can be used which serves as a better lubricating media than grease to lubricate the bearings used in the impeller drive assembly. In addition, the oil used in the pump assembly may be continually re-circulated to decrease operation temperature of the bearings supporting the impeller shaft. The oil used to cool the bearings may also be used to cool the gears and the need for a seal at the first end of the impeller shaft is thereby removed which in turn results in a reduction of frictional loss and subsequent wear on the shaft due to the reduction in seals.

While the pump assembly is shown as discharging fluid at the second bearing, the pump assembly may be configured to discharge fluid from the reservoir at any one of the bearings disposed along the impeller shaft. Moreover, the pump assembly is not limited to the two check valves discussed and shown herein, and the pump assembly may include a variety of check valves and different combinations thereof as deemed necessary for operation of the pump assembly.

We claim:

1. A shaft assembly comprising:
   a shaft having first and second ends and arranged for rotation about an axis of rotation;
   a first bearing arrangement engaging the first end of the rotating shaft;
   a second bearing arrangement axially spaced from the first bearing arrangement and engaging a middle length portion of the shaft;
   a circular cam member axially spaced from the first bearing arrangement and eccentrically secured axially along the middle length portion of the shaft and arranged to rotate about the shaft axis;
   a lock member axially spaced from the first bearing arrangement and engaging the middle length portion of the shaft and, in combination with the circular cam member, providing a preload to the first and second bearing arrangements;
   a piston pump including a cylinder body with a biased piston drivingly displaceable within the cylinder body and continuously engageable with the cam such that rotation of the cam corresponds to reciprocating movement of the piston within the cylinder body;
   a first valve connected to the piston pump and operable to permit the pumping of fluid into the cylinder body; and
   a second valve connected to the piston pump and operable to permit the pumping of fluid from the cylinder body of the piston pump.

2. The shaft assembly according to claim 1, further comprising a first passageway extending between the piston pump and the first valve, and a second passageway extending between the piston pump and the second valve.

3. The shaft assembly according to claim 1, further comprising a casing surrounding the rotating shaft and defining a reservoir for containing fluid.

4. The shaft assembly according to claim 3, further comprising a first fluid conduit extending from the first valve and in communication with the reservoir.

5. The shaft assembly according to claim 1, further comprising a second fluid conduit extending from the second valve to a location in proximity to the at least one bearing arrangement.

6. The shaft assembly according to claim 1, wherein the cylinder body and chambers of the first and second valves are defined in an assembly body.

7. The shaft assembly according to claim 6, wherein the assembly body further defines a plurality of passageways connecting the cylinder body to the chambers of the first and second valves.

8. A drive assembly for rotating an impeller of a food processing machine comprising:
   an impeller shaft having first and second ends and arranged for rotation about a first axis of rotation;
   a drive shaft arranged for being driven about a second axis of rotation;
   a gear arrangement engaging the second end of the impeller shaft and coupling the drive and impeller shafts;
   a first bearing arrangement engaging the first end of the impeller shaft;
   a second bearing arrangement axially spaced from the first bearing arrangement and engaging a middle length portion of the impeller shaft;
   a circular cam member axially spaced from the first bearing arrangement and eccentrically secured axially along the middle length portion of the impeller shaft and arranged to rotate about the impeller shaft axis;
   a lock member axially spaced from the first bearing arrangement and engaging the middle length portion of the impeller shaft and, in combination with the circular cam member, providing a preload to the first and second bearing arrangements;
   a piston pump including a cylinder body with a biased piston drivingly displaceable within the cylinder body and continuously engageable with the cam such that rotation of the cam corresponds to reciprocating movement of the piston within the cylinder body;
   a first valve connected to the piston pump and operable to permit the pumping of fluid into the cylinder body; and a second valve connected to the piston pump and operable to permit the pumping of fluid from the cylinder body of the piston pump.

9. The drive assembly according to claim 8, further comprising a casing surrounding the rotating shaft and defining a reservoir for containing fluid, the first fluid conduit being in communication with the reservoir.

10. The drive assembly according to claim 8, further comprising a first passageway extending between the piston pump and the first valve, and a second passageway extending between the piston pump and the second valve.

11. The drive assembly according to claim 8, further comprising a first fluid conduit extending from the first valve and in communication with the reservoir.

12. The drive assembly according to claim 8, further comprising a second fluid conduit extending from the second valve to a location in proximity to the at least one bearing arrangement.

13. The drive assembly according to claim 8, wherein the cylinder body and chambers of the first and second valves are defined in an assembly body.

14. The drive assembly according to claim 13, wherein the assembly body further defines a plurality of passageways connecting the cylinder body to the chambers of the first and second valves.

15. An impeller drive assembly for a food cutting machine comprising:

an impeller shaft having first and second ends and an axis of rotation;

a housing surrounding the impeller shaft and comprising a reservoir arranged for containing a body of fluid;

a first bearing arrangement engaging the first end of the impeller shaft;

a second bearing arrangement axially spaced from the first bearing arrangement and engaging a middle length portion of the impeller shaft;

a circular cam device axially spaced from the first bearing arrangement and eccentrically secured axially along the impeller shaft for rotation about the shaft axis of rotation;

a lock member axially spaced from the first bearing arrangement and engaging the middle length portion of the impeller shaft and, in combination with the circular cam member, providing a preload to the first and second bearing arrangements; and a pump assembly drivingly and continuously connected to the cam device and operable to pump fluid contained in the reservoir as the impeller shaft rotates about the shaft axis of rotation;

wherein the pump assembly is formed in an assembly body defining a cylinder body, a biased piston drivingly displaceable within the cylinder body, at least one valve body, and passageways for connecting the cylinder body and the at least one valve body.

* * * * *